Sept. 5, 1944.   A. L. JALBERT   2,357,471
AUTOMATIC EDGE INKING MACHINE
Filed Feb. 27, 1941   2 Sheets-Sheet 1

INVENTOR
Adrien L. Jalbert
By his attorney

Sept. 5, 1944.    A. L. JALBERT    2,357,471
AUTOMATIC EDGE INKING MACHINE
Filed Feb. 27, 1941    2 Sheets-Sheet 2

INVENTOR
Adrien L. Jalbert
By his Attorney

Patented Sept. 5, 1944

2,357,471

UNITED STATES PATENT OFFICE 2,357,471

AUTOMATIC EDGE INKING MACHINE

Adrien L. Jalbert, Haverhill, Mass., assignor to United Shoe Machinery Corporation, Flemington, N. J., a corporation of New Jersey Application February 27, 1941, Serial No. 380,955

16 Claims. (Cl. 91—51)

The present invention relates broadly to a machine for applying a coating to the peripheral edge of a piece of sheet material of regular or irregular contour and, as illustrated herein, more specifically relates to a machine for applying ink to the edge of a prefinished unattached sole.

In one method of shoemaking it is customary to prefinish the sole edge while it is unattached. In carrying out that method, machines have heretofore been employed for applying ink to the edges of these unattached soles which have comprised feed rolls arranged to grip the opposite sides of the sole and two or more abutments so arranged that movement of the sole lengthwise with its edge against the abutments by means of the feed rolls caused the sole to turn peripherally, the ink being supplied to the edge by an additional ink roll, or by one of the abutments, in which case the abutment would constitute an ink roll. In machines of that character it has been thought that the sole must be fed against at least two abutments in order to secure an automatic traverse of the sole about its peripheral edge.

The object of the present invention is to provide an improved machine for applying coating material such as ink to the edge of a sole rapidly and efficiently without damage to the edge of the sole by undue pressure and in which but a single abutment is employed for directing the sole in its peripheral movement.

In the attainment of this object, invention resides in the combination of a pair of driven feed rolls having oppositely disposed frusto-conical end faces adapted to grip the opposite sides of the sole and a single abutment offset from the work-engaging surfaces of the feed rolls against which the feed rolls move the edge of the sole peripherally, the single abutment comprising a roll a portion of which is supplied with ink from a receptacle.

The construction and operation of the machine will now be described in detail with reference to the accompanying drawings, in which Fig. 1 is a plan view of the machine;

The machine as illustrated herein comprises generally a pair of driven feed rolls 10 and 12 arranged to grip the opposite sides of a sole S and to move it lengthwise with its peripheral edge in constant engagement with the surface of a single abutment in the form of an ink roll 14 which is supplied with ink by an ink receptacle 16.

Figure 1:
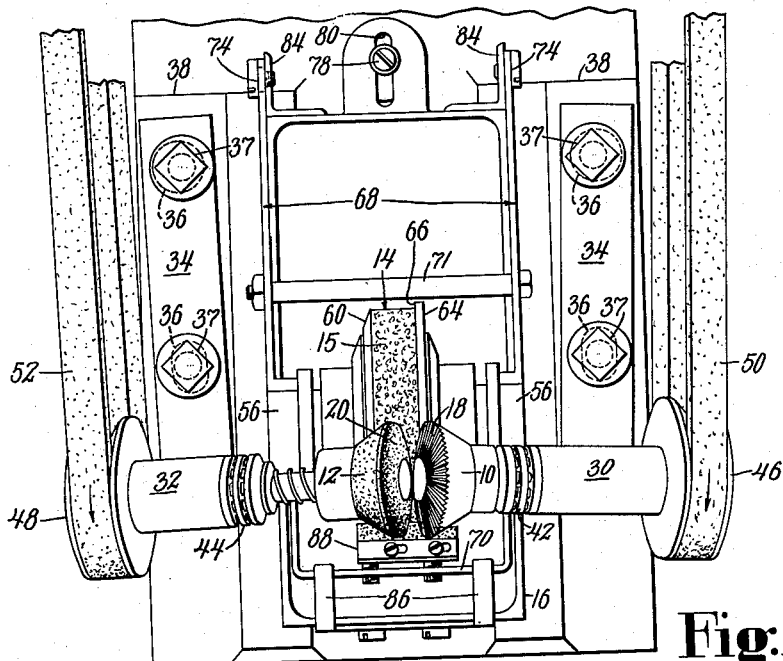
Figure 2:
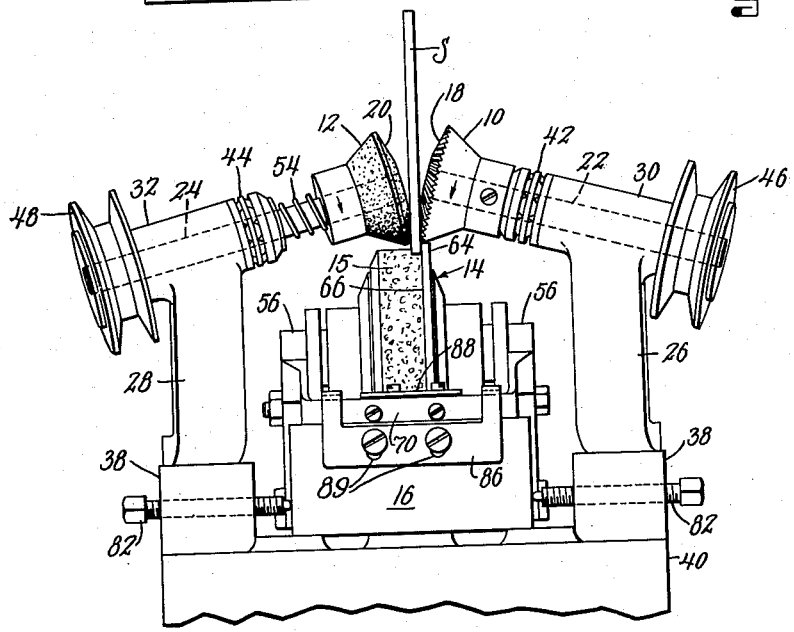
Fig. 2 is a front elevation of the machine.
Figure 3:
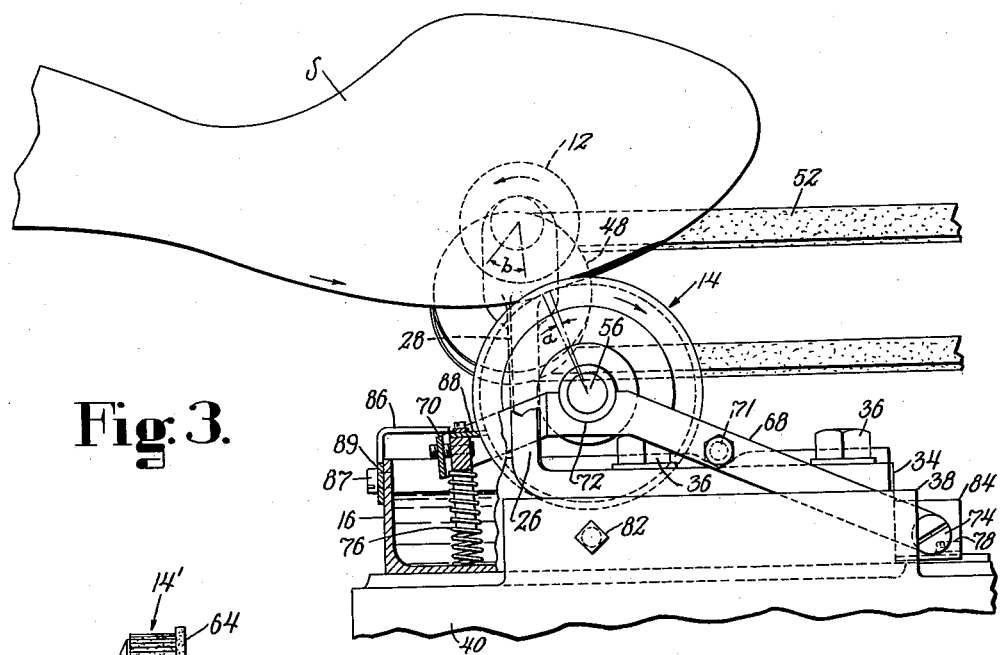
Fig. 3 is a side elevation of the machine showing the position of the sole as it is traversed.

The feed rolls 10 and 12 are provided with frusto-conical end faces 18 and 20 arranged to grip the opposite sides of the sole and, while holding it on edge in a vertical plane, to move it in a curvilinear path. The feed rolls are supported for rotation in this position on the inner ends of a pair of shafts 22 and 24 which slope downwardly away from each other, thereby tipping the rolls away from each other from bottom to top so that the work-engaging portions of the frusto-conical surfaces are substantially parallel (Fig. 2). The shafts are journaled at the upper ends of a pair of posts 26 and 28 (Fig. 2) in bearings 30 and 32, the posts terminating at their lower ends in right-angled extensions 34 (Fig. 1) which are adjustably bolted by means of slot-and-screw connections 36 and 37 to walls 38 formed integral with the opposite sides of a base 40. The rear slots are enlarged widthwise so that the extensions 34 may be toed out about the front screws 37, thereby tilting the outer ends of the shafts 22 and 24 to the front about their inner ends as centers (Fig. 1), for a purpose which will appear hereinafter. Ball bearings 42 and 44 are placed on the shafts between the ends of the bearings 30 and 32 and the hubs of the feed rolls 10 and 12 to take up the end thrust produced by the slope of the shafts. The shafts 22 and 24 are rotated by means of pulleys 46 and 48 fixed to the outer ends of the shafts, the pulleys being driven by belts 50 and 52 which connect them to a source of power (not shown). In order to insure a positive nonslip feed, one of the feed rolls is made unyielding and the other is yieldably urged toward the unyielding roll to grip the opposite sides of the sole. As illustrated, the shaft 22 is fixed against endwise movement in its bearing. Consequently, the position of the feed roll 10 is fixed. The feed roll 12, however, is yieldably urged toward the feed roll 10 by means of a spring 54 placed on the shaft 24 between the ball bearing 44 and the hub of the feed roll 12. To further facilitate feeding the work, the roll 12 which engages the grain surface of the sole is made of rubber to increase the friction between its conical surface and the sole without damaging the grain surface. The pressure of the roll 12 depresses the conical surface 20 of the roll somewhat so that the contact between the sole and the surface of this roll extends over a sector of its conical surface, represented by the character $b$ (Fig. 3). The conical surface of the roll 10 which engages the flesh side of the sole is toothed so that it bites into the surface of the sole. As a result, the contact between the sole and the roll 10 is a corresponding sector of its surface. The relatively large area of contact between the sole and the feed rolls tends to steady the sole in its movement.

The conical feed rolls, since their outer peripheries move faster than their inner peripheries, tend to turn the sole in a circular path. Consequently, in order to guide the sole lengthwise about its periphery as it is moved by the feed rolls, a single abutment is provided against which the sole is pushed. The abutment restrains the circular movement of the sole, causing the sole to travel in a curvilinear path with its edge always at a fixed distance from the work-engaging portion of the feed rolls. The tilt to the front given to the shafts 22 and 24 tips the feed rolls away from each other from front to back, thereby shifting the work-engaging portions $b$ of the feed rolls to the front of the lowermost point of the feed rolls (Fig. 3) so that there is a pronounced downward component of force which tends to push the ingoing side of the sole into contact with the abutment. At the same time, the conical surfaces of the feed rolls are relieved at the rear so that the sole is free to leave the feed rolls at the outgoing side without being lifted from the ink roll.

The abutment ink roll 14 (Fig. 3) is disposed on an axle 56 journaled below and back of the axes of the feed rolls with its top behind and substantially on a level with the bottom of the feed rolls. The sole contacts the surface of the ink roll at a point on its surface which lies below the top surface of the ink roll and back of the lowermost point of the feed rolls.

It is found that if the surface of the ink roll is perfectly smooth there is a tendency for the ink to be squeezed laterally between the edge of the sole and the ink roll due to the pressure between the two caused by the feeding action. This is particularly true where the edge of the sole is dense or has been subjected to burnishing or other condensing operation so that it is not readily absorbent. To overcome this and to insure a uniform, even application of ink to the edge of the sole, the ink roll 14, as shown in Figs 1 and 2, is composed of a granular material 15, for example, the common synthetic abrasive stones. These are made by molding a mass of granules of silicon carbide or aluminum oxide in the shape of a stone or wheel and sintering them so as to form a composite article. The surface of a stone of this type is composed of a plurality of cavities irregularly spaced and of different sizes and shapes. Some of the cavities are shallow and others lie almost wholly below the surface, being connected to the surface by very small openings in comparison to their volume. The rough surface of the stone provides a large number of irregularly disposed cavities. These cavities hold small bodies of ink which serve uniformly to coat the edge of the sole in spite of the pressure between the edge of the sole and the surface of the roll. When a nonyielding surface such as described is employed, the contact between the edge of the sole and the surface of the ink roll is substantially line contact, shown at $a$ (Fig. 3).

Figure 4:
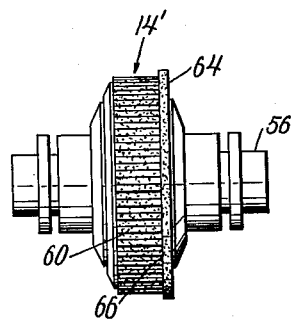
Fig. 4 shows a modified form of the ink roll.
Figure 5:
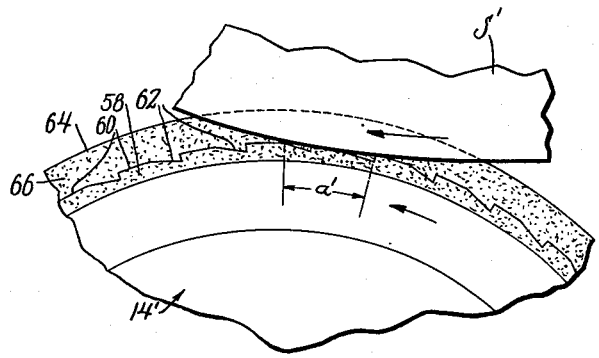
Fig. 5 is an enlarged fragment of the modified ink roll, showing the ink-carrying grooves.
Figure 6:
Fig. 6 is an enlarged view of the edge of a sole after treatment with the modified ink roll.

A modified roll 14' (Fig. 4) may be supplied with this machine for providing novelty edge effects. One such ink roll is shown (Fig. 5) as provided with a cover 58 consisting of rubber the surface of which is provided with transverse truncated teeth 60. Thus, a series of ink pockets 62 are provided which, as illustrated in Fig. 5, serve to supply a quantity of ink to the edge of a sole S' even when considerable pressure exists between the sole and the surface of the roll. Because some of the ink is squeezed from between the edge of the sole and the top surfaces of the teeth, there is less ink applied to the edge of the sole where the teeth contact it. Consequently, a series of alternate light and dark bands are formed along the edge of the sole S' (Fig. 6). The width and shape of these markings may be modified in accordance with the desires of the manufacturer. When the ink roll is composed of rubber, the pressure between the edge of the sole and the ink roll depresses the surface of the roll so that the sole engages the surface of the ink roll along an arcuate portion thereof, indicated at $a'$ in Fig. 5. The arcuate area of contact between the sole and the ink roll tends further to stabilize the sole during its movement.

Some manufacturers desire to apply ink to the upper marginal portion of the sole, that is, to the marginal flesh surface adjacent to the edge, as well as to the edge of the sole. Provision is made for this by providing a peripheral raised shoulder 64 on the ink roll 14 or 14' the inner surface 66 of which is at right angles to the peripheral surface of the roll and which may be supplied with a film of ink. The inner or work-engaging surface 66 of the shoulder is substantially in a plane with the conical work-engaging portion $b$ of the surface of the unyielding feed roll 10. Consequently, the sole is held with its margin against the inner surface 66 of the shoulder by the spring-pressed feed roll 12.

To permit cleaning, the ink roll 14 or 14' is removably journaled above the ink receptacle in a frame consisting of a pair of arms 68 joined at their front ends by a crosspiece 70 integral therewith and between their ends by a crossbolt 71 (Fig. 1). Notches 72 are provided in the arms for the reception of the ends of the axle 56. The rear ends of the arms are pivoted to the ink receptacle 16 at 74 in a pair of angles 84 fixed to the rear of the receptacle, and a pair of springs 76 are fixed to the front crosspiece 70, as shown in Fig. 3, to constantly urge the frame, and consequently the ink roll 14, toward the feeding rolls. This insures contact between the ink roll and the edge of the sole at all times. A pair of angles 86 are screwed to the front upper edge of the receptacle with their inner ends overlapping the crosspiece 70, thereby serving as stops to prevent the springs 76 from raising the ink roll into contact with the feed rolls. The angles 86 are attached to the receptacle by screws 87 which pass through slots 89 formed therein, thereby permitting adjustment of the ink roll heightwise.

The ink roll dips into the ink receptacle 16 which rests on the base 40 between the walls 38. To permit adjustment of the ink roll longitudinally with respect to the feed rolls, the ink receptacle upon which the ink roll is mounted is adjustably fastened to the base 40 by a screw-and-slot connection 78 and 80 at its rear end (Fig. 1), which permits movement from front to back, and is contacted by a pair of screws 82 at its front end (Fig. 2), which effect movement from side to side. The screws 82 are threaded through the walls 38 of the base at opposite sides of the ink receptacle with their inner ends abutting the sides of the ink receptacle (Fig. 2).

A scraper plate 88 is fastened to the crosspiece 70 for removing excess ink from the ink roll and is provided with an indented edge so as to fit the inner surface 66 and the periphery of the shoulder of the ink roll. The scraper 88 is made so that it may be adjusted widthwise of the roll 14 and, consequently, it may be adjusted to a position so that the ink may be completely removed from the inner work-engaging surface 66 of the shoulder, thereby eliminating the application of ink to the marginal portion of the sole, if this is desirable.

In operation, the margin of the sole is placed between the rotating feed rolls 10 and 12 which immediately grip it and pull it into engagement with the ink roll 14 and simultaneously feed it toward the back of the machine. After one complete traverse of the sole margin, the operator grasps the sole and withdraws it from the rolls by giving it a quick pull. The only adjustments necessary are properly to position the ink roll 14 with respect to the feed rolls 10 and 12 and the feed rolls with respect to each other, to obtain the automatic feed necessary to traverse the sole peripherally, and adjustment of the scrapers to obtain the proper quantity of ink.

If two identical units, such as the one herein shown, are disposed side by side, the operator may use both hands, introducing a sole to one unit with one hand while withdrawing a sole from the other unit with the other hand, thereby saving time and increasing production.

Having described my invention, what I claim as new and desire to secure by Letters Patent of the United States is:

1. A machine for inking the edge of a sole comprising a pair of feed rolls, the end faces of said feed rolls being frusto-conical and co-operating to grip the opposite sides of the sole, a single abutment offset from the work-engaging surfaces of the feed rolls, means for rotating said feed rolls thereby to force said sole against said single abutment, said single abutment comprising a roll mounted for rotation about an axis substantially normal to the plane of the sole, and means for supplying ink to the surface of said roll.

2. A machine for inking the edge of a sole comprising a pair of feed rolls, the end faces of said feed rolls being frusto-conical and co-operating to grip the opposite sides of the sole, a single abutment consisting of an ink roll, and means for rotating said feed rolls thereby to force said sole against said ink roll, the work-engaging portion of the ink roll lying below and behind the work-engaging portions of the feed rolls and below the top of the ink roll.

3. A machine for inking the edge of a sole comprising a pair of feed rolls having oppositely disposed frusto-conical ends adapted to engage the opposite sides of the sole, means for tilting said rolls from front to back, a single abutment, means for rotating said feed rolls so as to move the sole peripherally against said abutment, and means for supplying ink to said abutment.

4. A machine for inking the edge of a sole comprising a pair of feed rolls having oppositely disposed frusto-conical ends, said rolls being tipped away from each other from bottom to top to bring the lower portions of the frusto-conical surfaces into engagement with the opposite sides of the sole, means for tilting said rolls away from each other from front to back, a single abutment, means for rotating said rolls so as to move the sole peripherally against said abutment, and means for supplying ink to said abutment.

5. A machine for inking the edge of a sole comprising a pair of feed rolls having frusto-conical end faces, shafts for supporting said feed rolls, said shafts sloping downwardly away from each other to bring the lower portions of the frusto-conical surfaces into engagement with the opposite sides of the sole, means for tilting said shafts to tip the work-engaging portions of said feed rolls away from each other from their ingoing to their outgoing sides, means for rotating said shafts, a single abutment against which the edge of the sole is moved by said feed rolls, and means for supplying ink to said abutment.

6. A machine for inking the edge of a sole comprising a pair of feed rolls having frusto-conical end faces, shafts for supporting said feed rolls, said shafts sloping downwardly and forwardly with respect to each other to cause the feed rolls to diverge from bottom to top and from their ingoing to their outgoing sides, means for rotating said shafts, a single abutment against which the edge of the sole is moved by the feed rolls, and means for supplying ink to said abutment.

7. A machine for applying ink to the edge of a sole comprising a pair of feed rolls one of which is held against axial movement and the other of which is movable axially, means for yieldably urging the axially movable feed roll toward the other feed roll, said feed rolls having frusto-conical end faces adjacent portions of which co-operate to engage the opposite sides of the sole, and an ink roll disposed adjacent to the feed rolls, said ink roll having an applying surface substantially in the plane of the work-engaging portion of the surface of said first-mentioned feed roll.

8. A machine for applying ink to the edge of a sole comprising a pair of feed rolls, said feed rolls having oppositely disposed frusto-conical end faces adapted to engage the opposite sides of the sole, and a rotatable ink roll having horizontal and vertical ink-applying surfaces, the vertical surface being substantially in the plane of the work-engaging portion of the surface of one of said feed rolls.

9. A machine for traversing a sole peripherally comprising a pair of feed rolls, said feed rolls having oppositely disposed frusto-conical end faces adapted to grip the opposite sides of the sole, a single abutment below the work-engaging surfaces of the feed rolls, horizontal and vertical sole-engaging surfaces on said abutment, means for rotating said feed rolls thereby to force said sole against the horizontal surface of the single abutment, means for urging one of said feed rolls laterally toward the other thereby to force the marginal portion of said sole against the vertical surface of the single abutment, and means for supplying ink to the horizontal and vertical surfaces of said single abutment.

10. A machine for inking the edge of a sole comprising a pair of feed rolls and an ink roll, said feed rolls being adapted to move said sole peripherally against said ink roll, the latter having a yieldable surface composed of regularly spaced, alternate applying surfaces and recesses, said recesses supplying more ink to the edge of the sole than the applying surfaces whereby the edge of the sole is coated with a series of alternate contrasting stripes.

11. A machine for inking the edge and adjacent margin of a sole comprising a pair of feed rolls and an ink roll, said feed rolls co-operating to move said sole peripherally against the ink roll, the latter having a horizontal toothed surface for carrying a quantity of ink into contact with the peripheral edge of the sole and a vertical surface adjacent to the horizontal surface and substantially in the plane of the work-engaging surface of one of the feed rolls for applying ink to the marginal portion of the sole.

12. A machine for inking the edge and adjacent margin of a sole comprising an ink roll having a horizontal surface characterized by having a plurality of cavities, some of which have re-entrant walls, and a vertical smooth metal surface adjacent thereto, and means for supplying ink to the surfaces of said ink roll.

13. A machine for traversing a sole peripherally comprising a pair of feed rolls adapted to engage the opposite sides of the sole, an ink roll offset from the work-engaging surfaces of the feed rolls, means for rotating said feed rolls whereby the periphery of the sole is moved against the ink roll, an axle for said ink roll, means for supporting said axle with its axis in a plane substantially normal to the planes of the work-engaging portions of the surfaces of the feed rolls, and means for yieldably urging said axle and consequently said ink roll toward the feed rolls.

14. A machine for traversing a sole peripherally comprising a pair of feed rolls adapted to engage the opposite sides of the sole, an ink roll offset from the work-engaging surfaces of the feed rolls, means for rotating said feed rolls, means for rotating said feed rolls whereby the periphery of the sole is moved against the ink roll, an axle for said ink roll, a pair of arms for supporting said ink roll, said arms being pivoted at one end, notches in said arms for removably receiving the ends of the axle of the ink roll, and springs yieldably urging the other ends of the arms upwardly toward the feed rolls.

15. In a machine for applying ink to the edge of a sole, in combination, an ink applying roll, means for automatically turning the sole relative to the ink applying roll to cause the entire peripheral edge of the sole to have rolling contact with the ink applying roll, and means for supplying ink to the ink applying roll, said ink applying roll having a surface which is characterized by having a plurality of cavities of varying sizes which are irregularly spaced and some of which have re-entrant walls.

16. In a machine for applying ink to the edge of a sole, in combination, an ink applying roll, means for automatically turning the sole relative to the ink applying roll to cause the entire peripheral edge of the sole to have rolling contact with the ink applying roll, and means for supplying ink to said ink applying roll, said ink applying roll having a peripheral surface which is rigid and is pitted with a multitude of cavities of diverse sizes and irregularly spaced, some of said cavities lying below the surface and having entrances therefrom which are small in comparison to their volume.

ADRIEN L. JALBERT.

CERTIFICATE OF CORRECTION.

Patent No. 2,357,471. September 5, 1944.

ADRIEN L. JALBERT.

It is hereby certified that error appears in the printed specification of the above numbered patent requiring correction as follows: Page 4, first column, line 34, after "rolls," strike out "means for rotating said feed rolls,"; and that the said Letters Patent should be read with this correction therein that the same may conform to the record of the case in the Patent Office.

Signed and sealed this 5th day of December, A. D. 1944.

Leslie Frazer (Seal) Acting Commissioner of Patents.